United States Patent
Dube et al.

(10) Patent No.: US 9,517,918 B2
(45) Date of Patent: Dec. 13, 2016

(54) CAR MOUNTED OVERSPEED GOVERNOR ACTUATION DEVICE

(75) Inventors: Randall S. Dube, Glastonbury, CT (US); Jeffrey Sepelak, Middlebury, CT (US); Justin Billard, Amston, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 73 days.

(21) Appl. No.: 14/402,710

(22) PCT Filed: May 31, 2012

(86) PCT No.: PCT/US2012/040259
§ 371 (c)(1),
(2), (4) Date: Nov. 21, 2014

(87) PCT Pub. No.: WO2013/180721
PCT Pub. Date: Dec. 5, 2013

(65) Prior Publication Data
US 2015/0136544 A1 May 21, 2015

(51) Int. Cl.
| | |
|---|---|
| *B66B 5/04* | (2006.01) |
| *F16D 3/10* | (2006.01) |
| *F16D 3/12* | (2006.01) |
| *F16D 3/52* | (2006.01) |
| *B66B 5/18* | (2006.01) |

(52) U.S. Cl.
CPC .............. *B66B 5/044* (2013.01); *B66B 5/18* (2013.01); *F16D 3/10* (2013.01); *F16D 3/12* (2013.01); *F16D 3/52* (2013.01)

(58) Field of Classification Search
CPC .............. B66B 5/04; B66B 5/044; B66B 5/16; B66B 5/18

USPC ........ 188/180, 184, 185; 187/287, 305, 373, 187/374
See application file for complete search history.

(56) References Cited

U.S. PATENT DOCUMENTS

| | | | |
|---|---|---|---|
| 4,531,617 A * | 7/1985 | Martin | ................... B66B 5/044 187/373 |
| 5,005,681 A | 4/1991 | Pipes | |
| 5,377,786 A | 1/1995 | Nakagawa | |
| 2001/0037920 A1 | 11/2001 | Draper et al. | |
| 2003/0042079 A1 | 3/2003 | Sanchez et al. | |
| 2004/0134726 A1 | 7/2004 | Sanchez et al. | |
| 2009/0266648 A1 | 10/2009 | Bazterra et al. | |

FOREIGN PATENT DOCUMENTS

| | | |
|---|---|---|
| CN | 1062121 A | 6/1992 |
| WO | 2009027576 A1 | 3/2009 |
| WO | 2011146050 A1 | 11/2011 |

OTHER PUBLICATIONS

Chinese First Office Action and Search Report for application CN201280073646.1, mailed Dec. 28, 2015, 7pgs.
European Search Report for application 12878005.3, Dec. 17, 2015, 7 pages.
International Search Report and Written Opinion for application PCT/US2012/040259, dated Feb. 28, 2013, 9 pages.

* cited by examiner

*Primary Examiner* — Thomas J Williams
(74) *Attorney, Agent, or Firm* — Cantor Colburn LLP

(57) ABSTRACT

A device for reducing an actuation force spike in an elevator car safety system. The device includes an elevator car mounted overspeed governor, a safety gear, a safety lever, and a force reducing mechanism. The force reducing mechanism is connected in a series relationship with the safety lever between the overspeed governor and the safety gear.

17 Claims, 7 Drawing Sheets

CAR MOUNTED OVERSPEED GOVERNOR ACTUATION DEVICE

BACKGROUND OF THE INVENTION

Elevators typically include a safety system to stop an elevator from traveling at excessive speeds in response to an elevator component breaking or otherwise becoming inoperative, or deviations from an intended motion profile due to motion control software errors. Traditionally, elevator safety systems include a mechanical speed sensing device commonly referred to as an overspeed governor, a governor rope, and a mechanical linkage connected to safety gear for selectively frictionally engaging elevator guiderails. The overspeed governor is traditionally mounted either in a machine room or in the top or bottom of the hoistway. The safety system is mounted on the car, and a linkage or governor rope hitch connects the system with the governor. When the governor detects a dangerous situation due to excessive travelling speed, it sends a force to the safety gear through the tensioned governor rope and linkage. The safety gear then engages the guiderails, and stops the elevator car.

A recent advance in elevator safety is the car mounted overspeed governor. By mounting the overspeed governor on elevator car, it can be directly linked to the safety gear also on the car, minimizing delays in activating the safety gear once an overspeed condition has been reached. In past elevator systems, where the overspeed governor is mounted at the top of the elevator shaft or in a machine room, the overspeed governor was linked through a linkage to the safety gear by connection to a rope, which sometimes caused delays in activating the safety gear after reaching an overspeed due to the length and elasticity of the rope. Additional benefits of the car mounted overspeed governor include a reduction in the amount of governor rope required (a single length of rope for an elevator car compared to an entire governor rope loop); the ability to install the governor at the factory, rather than in the field; and the reduction in complexity of safety linkages by eliminating the need for springs to resist the inertial forces of the governor rope loop during a sudden stop.

BRIEF SUMMARY OF THE INVENTION

The present invention is a device for reducing an actuation force spike in an elevator car safety system. The device includes an elevator car mounted overspeed governor, a safety gear, a safety lever, and a force reducing mechanism. The force reducing mechanism is connected in a series relationship with the safety lever between the overspeed governor and the safety gear.

DETAILED DESCRIPTION

There is a desire for car mounted overspeed governors, such as the car mounted overspeed governor described in PCT Patent Application Publication WO2011/146050, incorporated herein by reference, to be employed on elevators moving at increasingly faster speeds. At faster speeds, actuation of a car mounted overspeed governor results in increased impact force or shock being transmitted from the governor, through the mechanical connections between the governor and the safety gear, to the safety gear itself. One approach to dealing with this problem is to strengthen the mechanical connections and the safety gear such that they can withstand the increased impact force without diminished reliability or durability. However, this leads to heavier, more costly mechanical connections and safety gear. Embodiments of the present invention include a force reduction mechanism between the overspeed governor and the safety gear. The force reduction mechanism spreads the impact force over a longer period of time, thereby reducing the magnitude of the shock transmitted from the governor to the safety gear.

Figure 1:
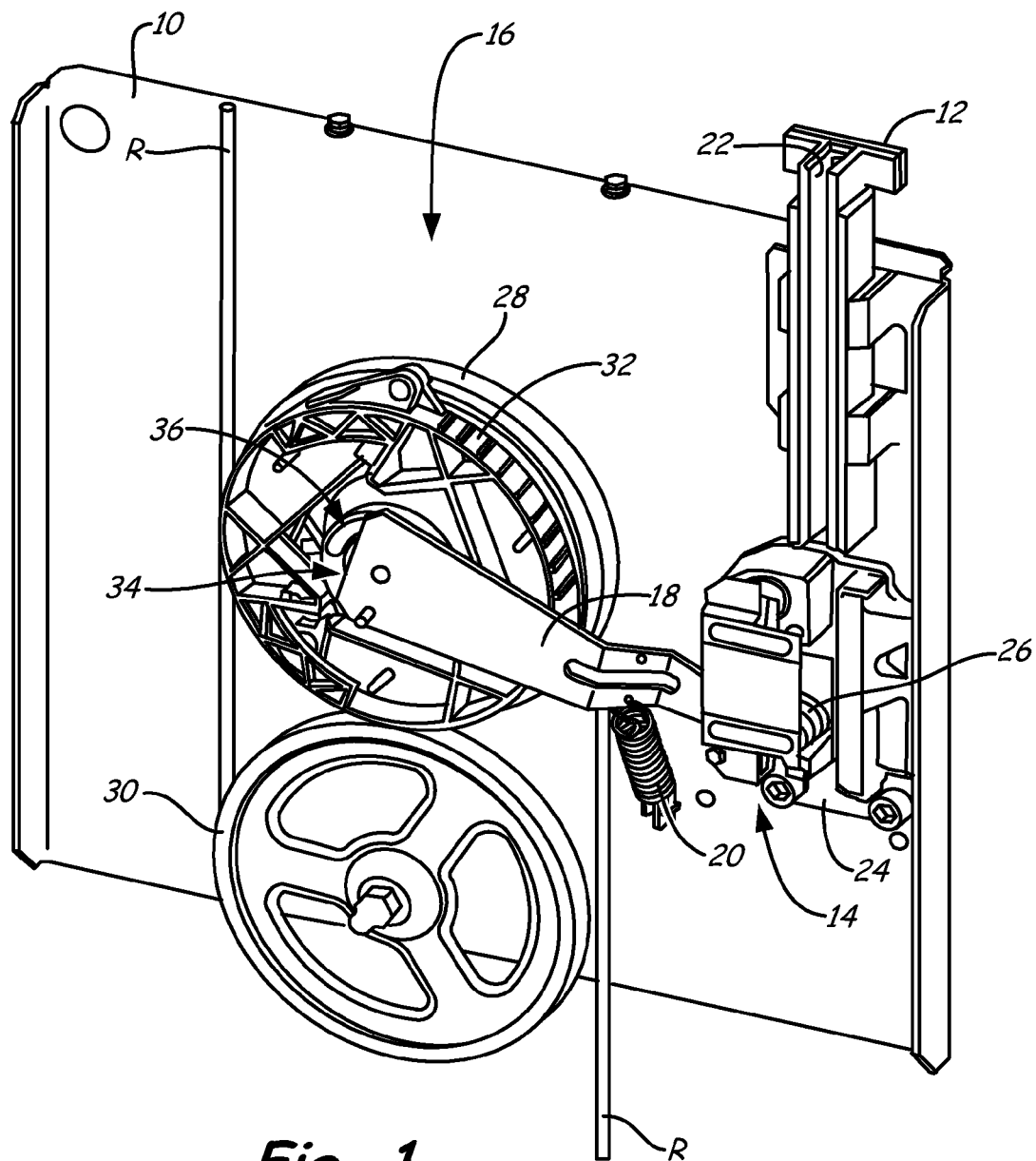
FIG. 1 is a perspective view of a car mounted governor assembly and safety gear.

FIG. 1 is a perspective view of a car mounted governor assembly and safety gear of a type adaptable to incorporate an embodiment of a force reduction mechanism of the present invention. FIG. 1 illustrates chassis 10, guiding device 12, safety gear 14, overspeed governor 16, safety lever 18, and stabilization device 20. Guiding device 12 includes channel 22. Safety gear 14 includes channel 24 and roller 26. Overspeed governor 16 includes tripping sheave 28, idler sheave 30, centrifugal tripping mechanism 32, and trip ring 34. Also shown in FIG. 1 is governor rope R. The embodiment of FIG. 1 also includes force reducing mechanism 36, which is described below in reference to FIG. 2.

Chassis 10 is attached to a side of an elevator car (not shown) near a guiderail (not shown) upon which the elevator car travels. Chassis 10 can be sheet metal and includes attachment points for guiding device 12, safety gear 14, overspeed governor 16, and stabilization device 20. Guiding device 12 is attached to chassis 10 and is aligned relative to the guiderail so that the guiderail slides through channel 22 as the elevator car moves up and down within an elevator shaft (not shown). Safety gear 14 is also attached to chassis 10 and aligned such that the guiderail slides through channel 24 so that roller 26 can engage the guiderail in an overspeed condition. Centrifugal tripping mechanism 32 is attached to tripping sheave 28, which is rotatably mounted to chassis 10. Idler sheave 30 is also rotatably mounted to chassis 10 adjacent to tripping sheave 28. Governor rope R is anchored at the top and free hanging, but tensioned by a mass at the bottom of the elevator shaft. Governor rope R travels around tripping sheave 28 and idler sheave 30. Safety lever 18 is connected to safety gear 14. Stabilization device 20 is connected to safety lever 18 to stabilize safety lever 18 to prevent vibration and acoustic noise when an overspeed condition is not occurring. Trip ring 34 is disposed within centrifugal tripping mechanism 32 but connects to centrifugal tripping mechanism 32 only during an overspeed condition. Force reducing mechanism 36 connects trip ring 34 to safety lever 18. Thus, force reducing mechanism 36 is connected in series relationship with safety lever 18 between overspeed governor 16 and safety gear 14.

In operation, as the elevator car moves up and down within the elevator shaft, governor rope copies the car speed to overspeed governor 16 by looping around tripping sheave 28 and idler sheave 30. Centrifugal tripping mechanism 32 rotates with tripping sheave 28. Should an overspeed condition be reached as the elevator car descends, centrifugal tripping mechanism 32 couples tripping sheave 28 to tripping ring 34. Once coupled, trip ring 34 moves with tripping sheave 28, both rotating in a counterclockwise direction. Force reducing mechanism 36 transmits the force of this rotation from trip ring 34 to safety lever 18. Safety lever 18 then moves against the restraining force of stabilization device 20. This counterclockwise movement of safety lever 18 then causes roller 26 inside safety gear 14 to move toward the guiderail within channel 24, frictionally engaging the guiderail and stopping the elevator car.

The fast coupling of trip ring 34 to tripping sheave 28 at high elevator car speeds has the potential to produce a large impact force or shock in components rigidly connected to trip ring 34. Force reducing mechanism 36 spreads the large impact force over a longer period of time, thereby reducing the magnitude of the impact force transmitted to safety lever 18 and on to safety gear 14. Without force reducing mechanism 36, safety lever 18 would be rigidly connected to trip ring 34 and experience the full magnitude of the large impact force. Safety gear 14 which is rigidly connected to safety lever 18 would also be subjected to the same large impact force.

Figure 2:
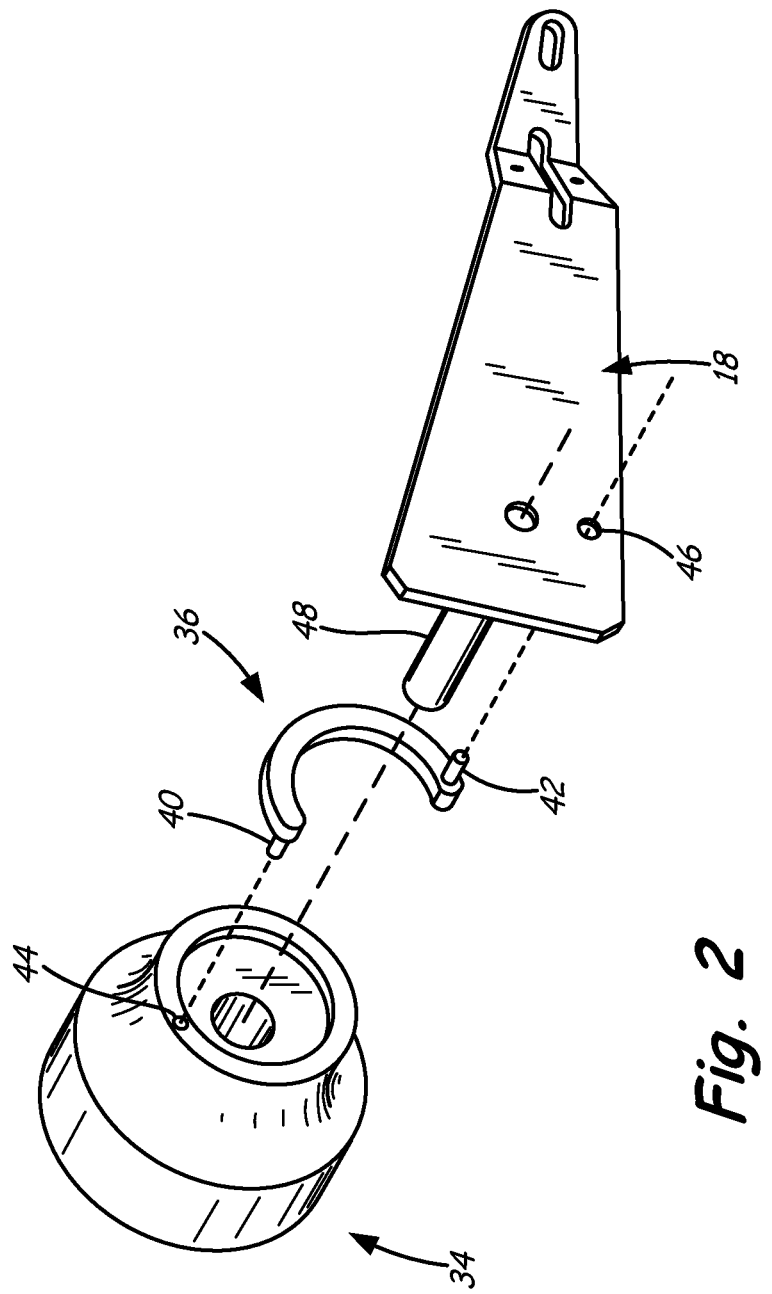
FIG. 2 is an exploded view of a portion of the embodiment of FIG. 1.

FIG. 2 is an exploded view of a portion of the embodiment of FIG. 1. FIG. 2 shows trip ring 34, safety lever 18, and force reducing mechanism 36. In this embodiment, force reducing mechanism 36 is a torsion spring. As is characteristic of a torsion spring, force reducing mechanism 36 includes a first end 40 and a second end 42. Trip ring 34 includes hole 44. Safety lever 18 includes hole 46 and shaft 48. Shaft 48 is fixedly attached to safety lever 18. First end 40 of force reducing mechanism 36 fits within hole 44 and second end 42 fits within hole 46 to connect safety lever 18 to trip ring 34. Shaft 48 is disposed within an opening within trip ring 34 such that safety lever 18 rotates about the same axis as centrifugal tripping mechanism 32 and tripping sheave 28. There is little contact between shaft 48 and trip ring 34 so that substantially all rotational force transmitted from trip ring 34 to safety lever 18 is by way of force reducing mechanism 36.

In operation, once trip ring 34 is coupled to tripping sheave 28 and begins to rotate in a counterclockwise direction, a portion of the impact force is absorbed by force reducing mechanism 36. The torsion spring (force reducing mechanism 36) begins to twist in response to the impact force applied at first end 40 and the inertia and mechanical resistance present at second end 42 from safety lever 18. As force reducing mechanism 36 absorbs more and more energy, it begins to smoothly increase the force applied to rotate safety lever 18, transmitting the rotation force from trip ring 34 to safety lever 18. In this way, force reducing mechanism 36 spreads the large impact force over a longer period of time, thereby reducing the magnitude of the impact force transmitted to safety lever 18 and on to safety gear 14.

Figure 3:
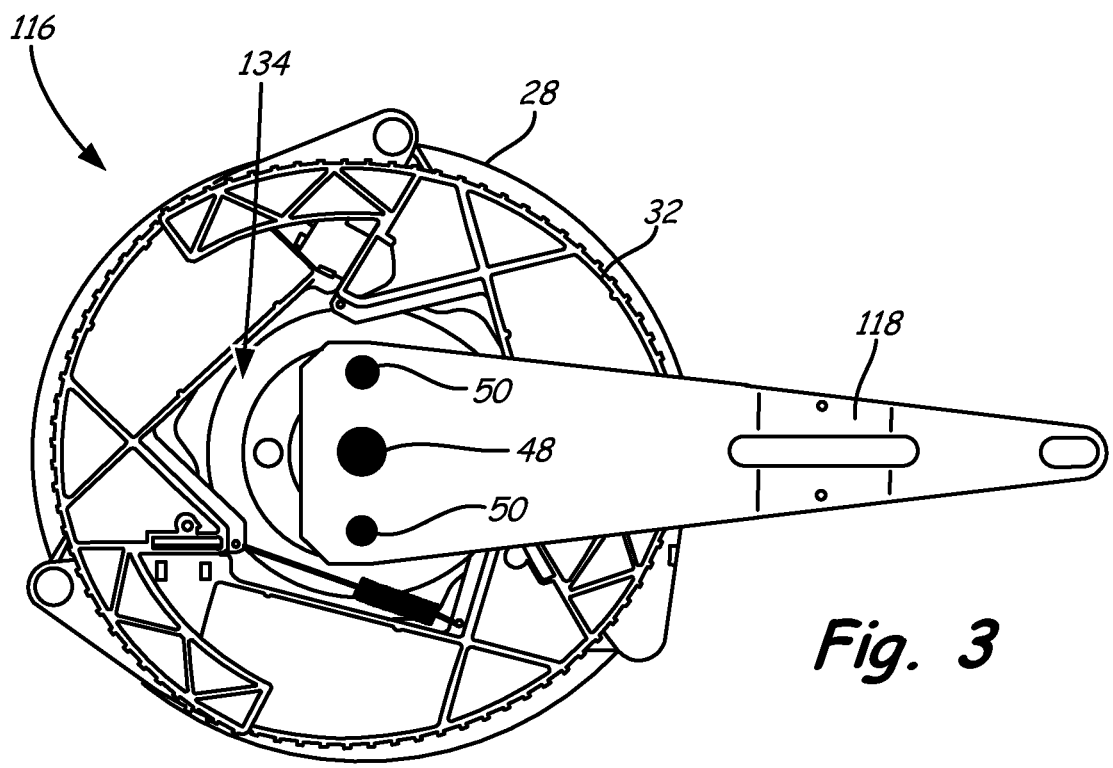
FIG. 3 is a front view of a portion of another embodiment of the car mounted governor assembly and force reducing mechanism of the present invention.

FIG. 3 is a front view of a portion of another embodiment of the car mounted governor assembly and force reducing mechanism of the present invention. FIG. 3 shows another embodiment where a force reducing mechanism connects an overspeed governor to a safety lever as in the embodiment discussed above in reference to FIGS. 1 and 2. FIG. 3 shows a portion of overspeed governor 116 including tripping sheave 28, centrifugal tripping mechanism 32, and trip ring 134. Overspeed governor 116 is identical to overspeed governor 16 described above, except that trip ring 134 replaces trip ring 34. FIG. 3 also shows safety lever 118. Safety lever 118 includes shaft 48 and at least one post 50 (two illustrated in this embodiment). The end of safety lever 118 opposite shaft 48 and post 50 is connected to safety gear 14 as shown in FIG. 1.

Figure 4:
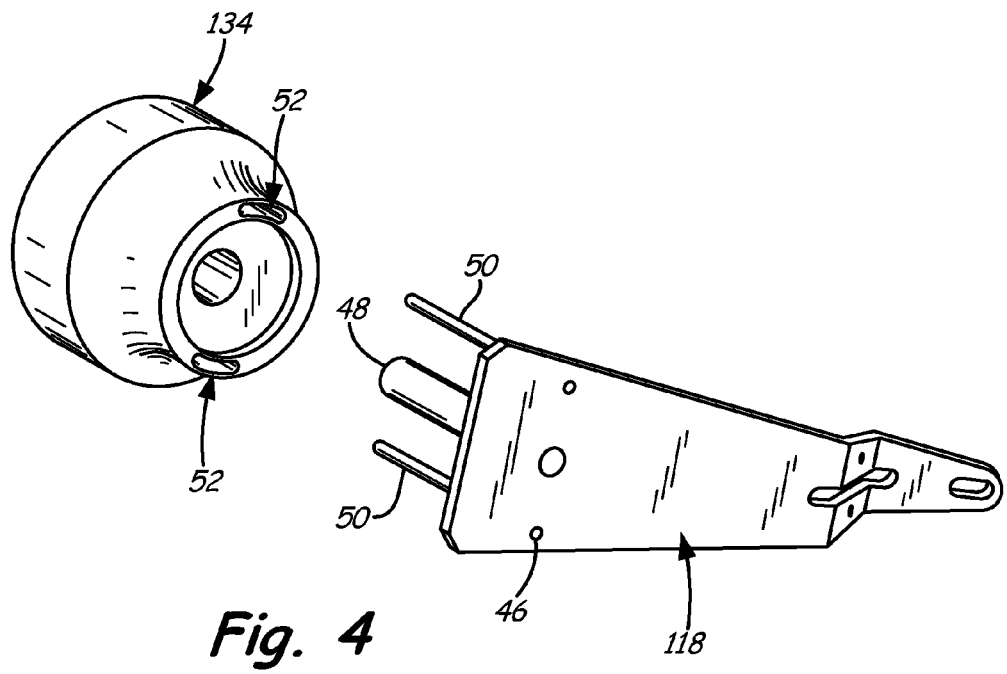
FIG. 4 is an exploded view of a portion of the embodiment of FIG. 3.
Figure 5:
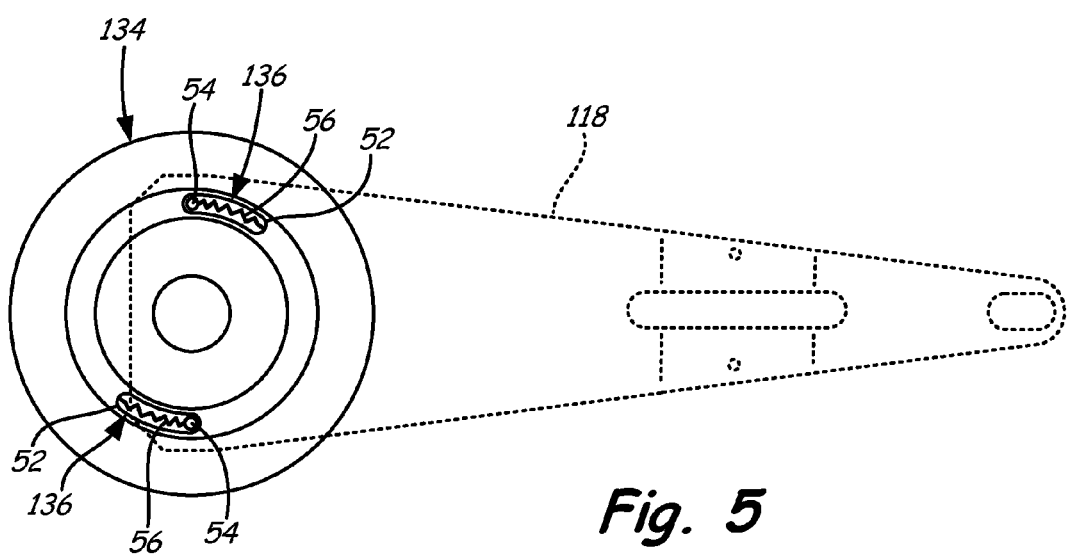
FIG. 5 is a front view of a portion of the embodiment of FIG. 3.

Details of this embodiment are illustrated further in FIGS. 4 and 5. FIG. 4 is an exploded view of a portion of the embodiment of FIG. 3. Shaft 48 and post 50 are more clearly shown in FIG. 4. Shaft 48 and posts 50 are fixedly attached to safety lever 118. Trip ring 134 includes channel 52 (two illustrated in this embodiment). The embodiment of FIG. 3 also includes force reducing mechanism 136. FIG. 5 is a front view of a portion of the embodiment of FIG. 3 looking through safety lever 118 to reveal the details of force reducing mechanism 136. Force reducing mechanism 136 includes post sleeve 54 and linear spring 56. The post sleeve 54 is fixedly attached to one end of linear spring 56. Linear spring 56 is disposed within channel 52 in trip ring 134 such that one end of linear spring 56 contacts one end of channel 52 and sleeve 54 contacts the other end of channel 52. Post 50 fits into sleeve 54. Thus, force reducing mechanism 136 is connected in series relationship with safety lever 118 between overspeed governor 116 and safety gear 14.

As with the embodiment describe above, shaft 48 is disposed within an opening within trip ring 134 such that safety lever 118 rotates about the same axis as centrifugal tripping mechanism 32 and tripping sheave 28. There is little contact between shaft 48 and trip ring 134 so that substantially all rotational force transmitted from trip ring 134 to safety lever 118 is by way of force reducing mechanism 136.

Considering FIGS. 3, 4, and 5 together, in operation, once trip ring 134 is coupled to tripping sheave 28 and begins to rotate in a counterclockwise direction, a portion of the impact force is absorbed by force reducing mechanism 136. Linear spring 56 begins to compress in response to the impact force applied at the end of linear spring 56 in contact with one end of channel 52 and the inertia and mechanical resistance present at sleeve 54 from post 50 of safety lever 118. As force reducing mechanism 136 absorbs more and more energy, it begins to smoothly increase the force applied to rotate safety lever 118, transmitting the rotation force from trip ring 134 to safety lever 118. In this way, force reducing mechanism 136 spreads the large impact force over a longer period of time, thereby reducing the magnitude of the impact force transmitted to safety lever 118 and on to safety gear 14 (as shown in FIG. 1).

Figure 6:
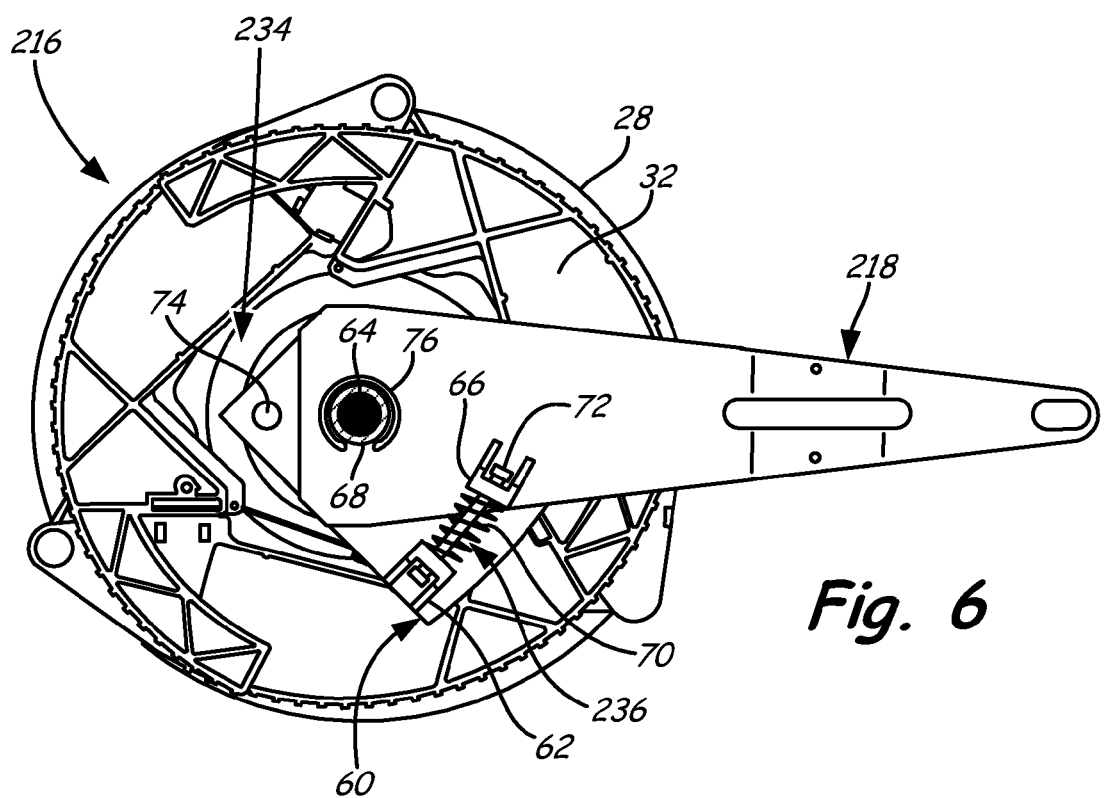
FIG. 6 is a front view of a portion of another embodiment of the car mounted governor assembly and force reducing mechanism of the present invention.
Figure 7:
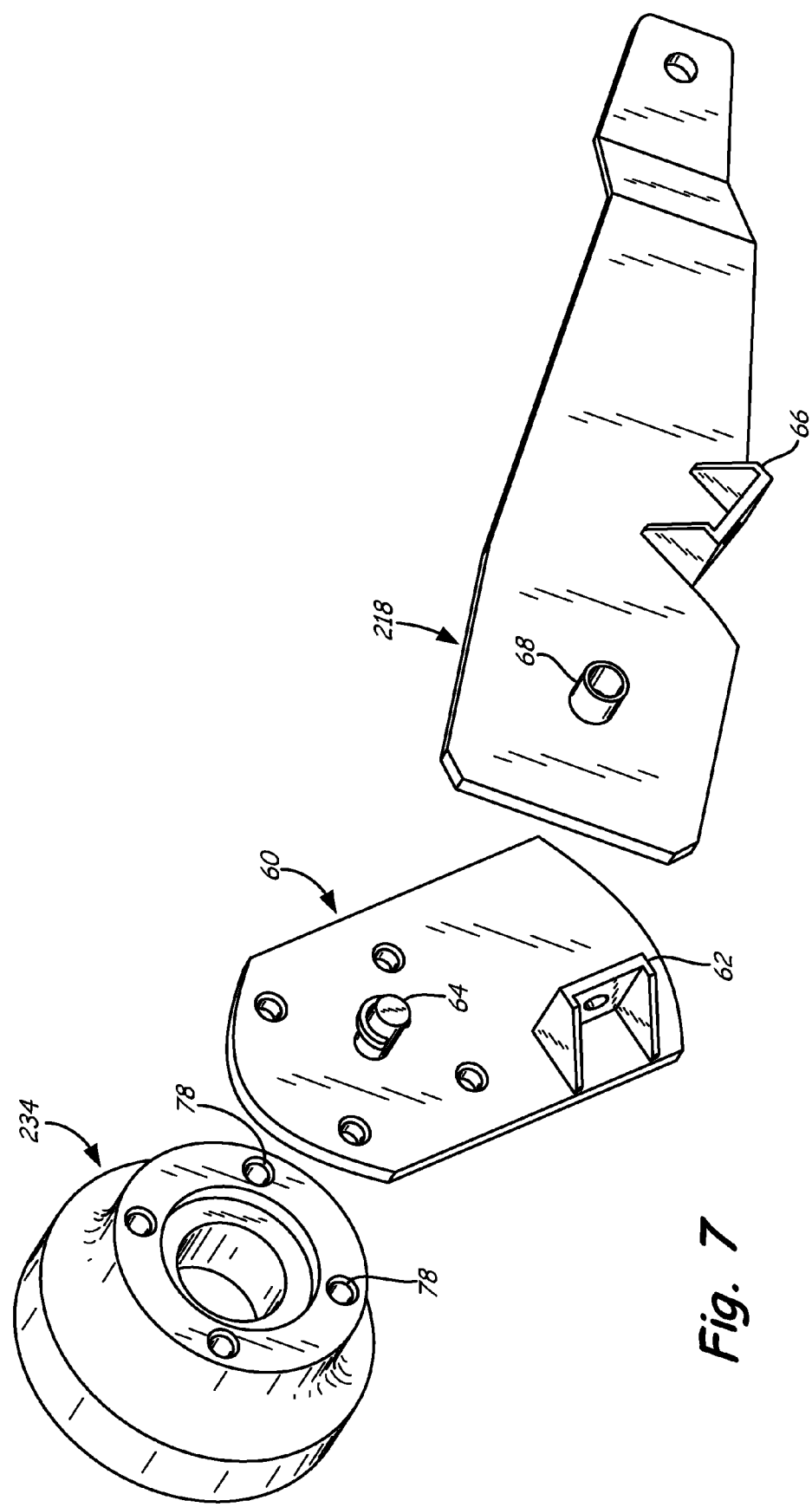
FIG. 7 is an exploded perspective view of a portion of the embodiment of FIG. 6.

FIG. 6 is a front view of a portion of another embodiment of the car mounted governor assembly and force reducing mechanism of the present invention. FIG. 6 shows another embodiment where a force reducing mechanism connects an overspeed governor to a safety lever as in the embodiment discussed above in reference to FIGS. 1 and 2. FIG. 6 shows a portion of overspeed governor 216 including tripping sheave 28, centrifugal tripping mechanism 32, and trip ring 234. Overspeed governor 216 is identical to overspeed governor 16 described above, except that trip ring 234 replaces trip ring 34. FIG. 6 also shows lifting arm 60, safety lever 218, and force reducing mechanism 236. Lifting arm 60 includes support 62 and shaft 64. Safety lever 218 includes support 66 and collar 68. Force reducing mechanism 236 includes helical spring 70 and coupling element 72. Also shown is one of a plurality of flat-head screws 74 and retaining clip 76. Details of this embodiment are illustrated further in FIG. 7. FIG. 7 is an exploded perspective view of a portion of the embodiment of FIG. 6. Shaft 64 and collar 68 are more clearly shown in FIG. 7. FIG. 7 also shows that trip ring 234 includes a plurality of threaded holes 78.

Considering FIGS. 6 and 7 together, lifting arm 60 is rigidly attached to trip ring 234 by a plurality of flat-head screws 74 engaging threaded holes 78. Collar 68 fits around shaft 64 to rotatably connect safety lever 218 to lifting arm 60. Collar 68 is secured around shaft 64 by retaining clip 76. Force reduction mechanism 236 is disposed between support 62 on lifting bar 60 and support 66 on safety lever 218 such that one end of helical spring 70 contacts support 62 and the other end contacts support 66. Coupling element 72 is, for example, a bolt penetrating holes in both support 62 and support 66 and secured at each end to keep helical spring 70 in contact with support 62 and support 66. The end of safety lever 218 opposite collar 68 is connected to safety gear 14 as shown in FIG. 1. Thus, force reducing mechanism 236 is connected in series relationship with safety lever 218 between overspeed governor 216 and safety gear 14.

In operation, once trip ring 234 is coupled to tripping sheave 28 and begins to rotate in a counterclockwise direction, lifting bar 60, which is rigidly attached to trip ring 234, also rotates in a counterclockwise direction. As lifting bar 60 rotates, helical spring 70 begins to compress in response to the impact force applied at the end of helical spring 70 in contact with support 62 and the inertia and mechanical resistance present at support 66 of safety lever 218. As helical spring 70 of force reducing mechanism 236 absorbs more and more energy, it begins to smoothly increase the force applied to support 66 to rotate safety lever 218, transmitting the rotation force from trip ring 234 to safety lever 218. In this way, force reducing mechanism 236 spreads the large impact force over a longer period of time, thereby reducing the magnitude of the impact force transmitted to safety lever 218 and on to safety gear 14 (as shown in FIG. 1).

Similar to the embodiments describe above, contact between lifting bar 60 and safety lever 218 is a low friction contact so that substantially all rotational force transmitted from trip ring 234 to safety lever 218 is by way of force reducing mechanism 236. Thus, the embodiment may optionally include a lubricant between shaft 64 and collar 68 as well as between overlapping facing surfaces of lifting bar 60 and safety lever 218. Alternatively, the embodiment may include a bushing or bearing between shaft 64 and collar 68.

Figure 8:
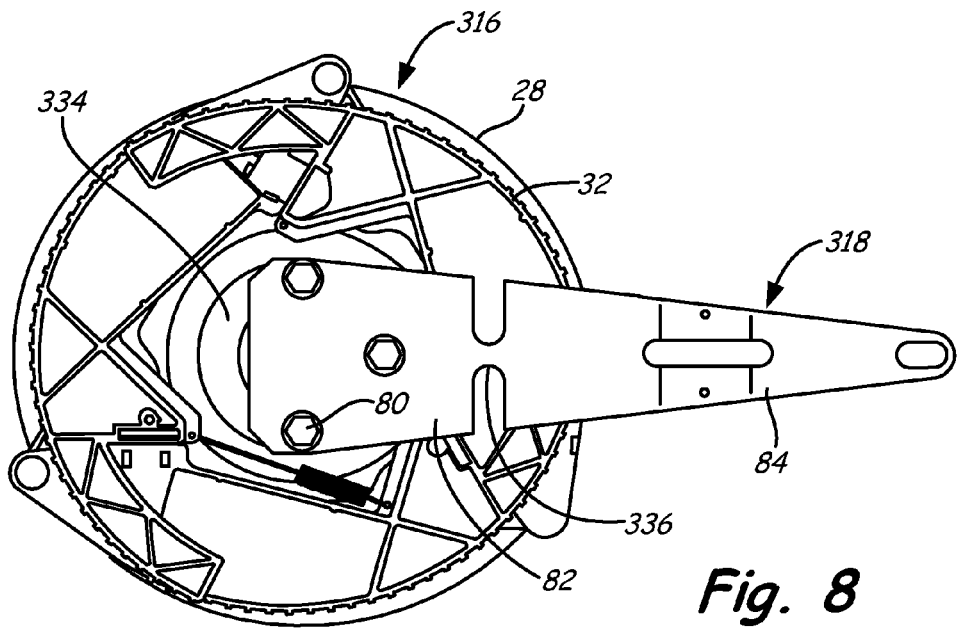
FIG. 8 is a front view of a portion of another embodiment of the car mounted governor assembly and force reducing mechanism of the present invention.

FIG. 8 is a front view of a portion of another embodiment of the car mounted governor assembly and force reducing mechanism of the present invention. Unlike the previous embodiments, FIG. 8 shows an embodiment where a force reducing mechanism is integral to the safety lever. FIG. 8 shows a portion of overspeed governor 316 including tripping sheave 28, centrifugal tripping mechanism 32, and trip ring 334. Overspeed governor 316 is identical to overspeed governor 16 described above, except that trip ring 334 replaces trip ring 34. FIG. 8 also shows safety lever 318 and bolts 80. Trip ring 334 is identical to trip ring 234 described above in reference to FIG. 7, except that the pattern of the plurality of threaded holes 78 may be different (e.g. the pattern illustrated for the embodiment of FIG. 8 employs only three threaded holes 78, which are not visible beneath bolts 80). Force reducing mechanism 336 is a necked down portion of safety lever 318 between first portion 82 of safety lever 318 and second portion 84 of safety lever 318. Force reducing mechanism 336 is necked down enough to provide sufficient energy absorbing compliance, but not so far as to cause safety lever 318 to fail mechanically under expected use. First portion 82 is rigidly connected to trip ring 334 by bolts 80 engaging threaded holes 78. Second portion 84 is connected to safety gear 14 as shown in FIG. 1. Thus, force reducing mechanism 336 is connected in series relationship with safety lever 318 (between first portion 82 and second portion 84) between overspeed governor 316 and safety gear 14.

In operation, once trip ring 334 is coupled to tripping sheave 28 and begins to rotate in a counterclockwise direction, first portion 82, which is rigidly attached to trip ring 334, also rotates in a counterclockwise direction. As first portion 82 rotates, force reducing mechanism 336 begins to flex in response to the impact force applied where first portion 82 meets force reducing mechanism 336 and the inertia and mechanical resistance present where force reducing mechanism 336 meets second portion 84. As force reducing mechanism 336 flexes to absorb more and more energy, it begins to smoothly increase the force applied to second portion 84, transmitting the rotation force from trip ring 334 to safety lever 318 where it connects to safety gear 14. In this way, force reducing mechanism 336 spreads the large impact force over a longer period of time, thereby reducing the magnitude of the impact force transmitted to safety gear 14 (as shown in FIG. 1).

Figure 9:
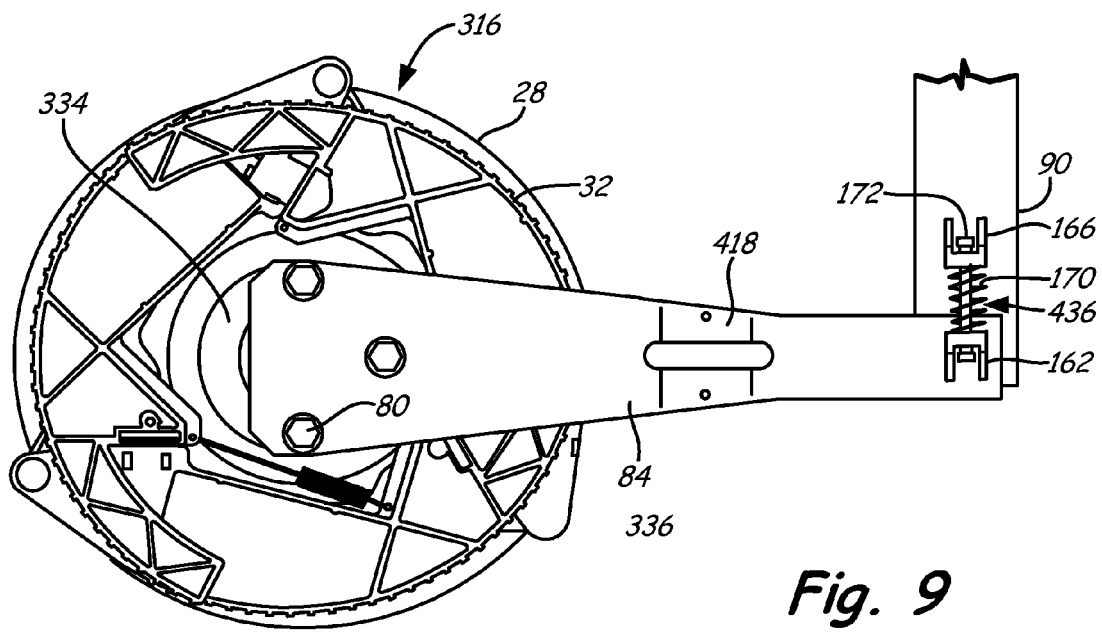
FIG. 9 is a front view of a portion of another embodiment of the car mounted governor assembly and force reducing mechanism of the present invention.

FIG. 9 is a front view of a portion of another embodiment of the car mounted governor assembly and force reducing mechanism of the present invention. Unlike the previous embodiments, FIG. 9 shows an embodiment where a force reducing mechanism connects a safety lever to a safety gear. FIG. 9 illustrates overspeed governor 316, safety lever 418, mechanical linkage 90, and force reducing mechanism 436. Overspeed governor 316 is as described above in reference to FIG. 8. Safety lever 418 includes support 162. Mechanical linkage includes support 166. Mechanical linkage 90 is a portion of safety gear 14 that shifts components within safety gear 14 to cause roller 26 inside safety gear 14 to move toward the guiderail within channel 24, frictionally engaging the guiderail and stopping the elevator car, as described above in reference to FIG. 1. Much like force reducing mechanism 236 described above in reference to FIGS. 6 and 7, force reducing mechanism 436 includes helical spring 170 and coupling element 172. Also shown are bolts 80.

Safety lever 418 is rigidly connected to trip ring 334 by bolts 80. Support 162 is disposed at an end of safety lever 418 opposite trip ring 334. Force reduction mechanism 436 is disposed between support 162 on safety lever 418 and support 166 on mechanical linkage 90 such that one end of helical spring 170 contacts support 162 and the other end contacts support 166. Coupling element 172 is, for example, a bolt penetrating holes in both support 162 and support 166 and secured at each end to keep helical spring 170 in contact with support 162 and support 166. Thus, force reducing mechanism 436 is connected in series relationship with safety lever 418 between overspeed governor 316 and safety gear 14.

In operation, once trip ring 334 is coupled to tripping sheave 28 and begins to rotate in a counterclockwise direction, safety lever 418, which is rigidly attached to trip ring 334, also rotates in a counterclockwise direction. As safety lever 418 rotates, helical spring 170 begins to compress in response to the impact force applied at the end of helical spring 170 in contact with support 162 and the inertia and mechanical resistance present at support 166 of mechanical linkage 90. As helical spring 170 of force reducing mechanism 436 absorbs more and more energy, it begins to smoothly increase the force applied to support 166 to move mechanical linkage 90, transmitting the rotation force from trip ring 334 and safety lever 418 to safety gear 14. In this way, force reducing mechanism 436 spreads the large impact force over a longer period of time, thereby reducing the magnitude of the impact force transmitted to safety gear 14.

In the embodiments describe above, specific resilient, energy absorbing components are described for the force reducing mechanism in each. However, it is understood that other resilient, energy absorbing structures may be used as well. For example, while the previous embodiment employs a helical spring, an elastomeric spring or a damping element such as a fluid-filled cylinder, may be employed as well.

The embodiments above are described in terms of a single type of car mounted overspeed governor. However, it is understood that the present invention applies to other types of car mount overspeed governors, for example, styles employing a trip ring located radially outward from the centrifugal tripping mechanism, rather than a trip ring located radially inward as in the illustrated embodiments.

The embodiments described above include a force reduction mechanism between an overspeed governor and a safety gear for an elevator. The force reduction mechanism spreads the impact force over a longer period of time, thereby reducing the magnitude of the shock transmitted from the governor to the safety gear. The invention is particularly advantageous for high speed elevators employing car mounted overspeed governors. By reducing the impact force or shock, the overspeed governor, mechanical connections, such as the safety lever, and the safety gear itself do not need to be strengthened to withstand the increased impact force resulting from actuation of the overspeed governor at high speeds. This results in lighter and less costly components.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A device for reducing an actuation force spike in an elevator car safety system, the device comprising:
    an elevator car mounted overspeed governor;
    a safety gear;
    a safety lever; and
    a force reducing mechanism connected with the safety lever to reduce an impact force transmitted from the overspeed governor to the safety lever and on to the safety gear;
    wherein the force reducing mechanism comprises at least one of a torsion spring and a linear spring at least partially contained within the overspeed governor.

2. The device of claim 1, wherein the force reducing mechanism connects the overspeed governor to the safety lever.

3. A device for reducing an actuation force spike in an elevator car safety system, the device comprising:
    an elevator car mounted overspeed governor;
    a safety gear;
    a safety lever; and
    a force reducing mechanism connected with the safety lever to reduce an impact force transmitted from the overspeed governor to the safety lever and on to the safety gear;
    wherein the force reducing mechanism comprises:
    a lifting bar rigidly connected to the overspeed governor; and
    an energy absorbing component that connects the lifting bar to the safety lever.

4. The device of claim 3, wherein the lifting bar and the safety lever rotate about a common axis.

5. The device of claim 3, wherein the energy absorbing component is at least one of a helical spring, an elastomeric spring, and a damping element.

6. A device for reducing an actuation force spike in an elevator car safety system, the device comprising:
    an elevator car mounted overspeed governor;
    a safety gear;
    a safety lever; and
    a force reducing mechanism connected with the safety lever to reduce an impact force transmitted from the overspeed governor to the safety lever and on to the safety gear;
    wherein the force reducing mechanism connects the safety lever to the safety gear.

7. The device of claim 6, wherein the force reducing mechanism is at least one of a helical spring, an elastomeric spring, and a damping element.

8. A device for reducing an actuation force spike in an elevator car safety system, the device comprising:
    an elevator car mounted overspeed governor;
    a safety gear;
    a safety lever; and
    a force reducing mechanism connected with the safety lever to reduce an impact force transmitted from the overspeed governor to the safety lever and on to the safety gear;
    wherein the force reducing mechanism connects a first portion of the safety lever to a second portion of the safety lever; the first portion of the safety lever rigidly connected to the overspeed governor, and the second portion rigidly connected to the safety gear.

9. The device of claim 8, wherein the force reducing mechanism is integral with safety lever, the force reducing mechanism comprising a portion of the safety lever narrowed relative to the first portion of the safety lever and the second portion of the safety lever.

10. An elevator car mounted overspeed governor assembly for actuating safety gear, the assembly comprising:
    a tripping sheave;
    a trip ring;
    a centrifugal mechanism connected to the tripping sheave, the centrifugal mechanism to couple the trip ring to the tripping sheave at a certain overspeed velocity;
    a safety lever for connecting to safety gear; and
    a force reducing mechanism connected with the safety lever to reduce an impact force transmitted from the overspeed governor to the safety lever and on to the safety gear;
    wherein the force reducing mechanism connects the trip ring to the safety lever.

11. The assembly of claim 10, wherein the force reducing mechanism comprises a torsion spring.

12. The assembly of claim 10, wherein the force reducing mechanism comprises a linear spring at least partially contained within the trip ring.

13. The assembly of claim 10, wherein the force reducing mechanism comprises:
 a lifting bar rigidly connected to the trip ring; and
 an energy absorbing component that connects the lifting bar to the safety lever.

14. The assembly of claim 13, wherein the lifting bar, the trip ring, and the safety lever rotate about a common axis.

15. The assembly of claim 13, wherein the energy absorbing component is at least one of a helical spring, an elastomeric spring, and a damping element.

16. An elevator car mounted overspeed governor assembly for actuating safety gear, the assembly comprising:
 a tripping sheave;
 a trip ring;
 a centrifugal mechanism connected to the tripping sheave, the centrifugal mechanism to couple the trip ring to the tripping sheave at a certain overspeed velocity;
 a safety lever for connecting to safety gear; and
 a force reducing mechanism connected with the safety lever to reduce an impact force transmitted from the overspeed governor to the safety lever and on to the safety gear;
 wherein the force reducing mechanism connects a first portion of the safety lever to a second portion of the safety lever; the first portion of the safety lever rigidly connected to the trip ring, and the second portion for rigidly connecting to the safety gear.

17. The assembly of claim 16, wherein the force reducing mechanism is integral with safety lever, the force reducing mechanism comprising a portion of the safety lever narrowed relative to the first portion of the safety lever and the second portion of the safety lever.

* * * * *